United States Patent
Chowdhury et al.

(10) Patent No.: US 12,398,238 B2
(45) Date of Patent: Aug. 26, 2025

(54) METHODS FOR MAKING SULFONATED POLY(PHENYLENE ETHER) AND ARTICLES MADE THEREFROM

(71) Applicant: SHPP GLOBAL TECHNOLOGIES B.V., Bergen op Zoom (NL)

(72) Inventors: Rajesh Chowdhury, Bangalore (IN); Senthil Tk, Bangalore (IN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 830 days.

(21) Appl. No.: 17/613,862

(22) PCT Filed: May 13, 2020

(86) PCT No.: PCT/IB2020/054535
§ 371 (c)(1),
(2) Date: Nov. 23, 2021

(87) PCT Pub. No.: WO2020/254885
PCT Pub. Date: Dec. 24, 2020

(65) Prior Publication Data
US 2022/0227931 A1    Jul. 21, 2022

(30) Foreign Application Priority Data
Jun. 18, 2019 (EP) .................................... 19180758

(51) Int. Cl.
*C08G 65/48* (2006.01)
*B01D 3/14* (2006.01)
(Continued)

(52) U.S. Cl.
CPC ........... *C08G 65/485* (2013.01); *B01D 3/143* (2013.01); *B01D 71/5223* (2022.08);
(Continued)

(58) Field of Classification Search
CPC .. C08G 65/485; B01D 71/5223; B01D 3/143; C08J 2371/12; H01M 8/1025; H01M 2008/1095
See application file for complete search history.

(56) References Cited

U.S. PATENT DOCUMENTS 3,259,592 A    7/1966  Fox et al.
3,631,130 A   12/1971  Klebe
(Continued)

FOREIGN PATENT DOCUMENTS

CA    1332325 C    10/1994
CN  101459245 A     6/2009
(Continued)

OTHER PUBLICATIONS

Acosta, J.L.; Fierro, J.L.G.; Linares, A.; Cassanova, M.J. Characterization of polymer systems based on sulfonated poly(2,6-dimethyl-1,4-phenylene oxide). Polym Int 49:1534-1538 (2000). (Year: 2000).*
(Continued)

*Primary Examiner* — Christina H. W. Rosebach
(74) *Attorney, Agent, or Firm* — CANTOR COLBURN LLP

(57) ABSTRACT

A method for sulfonation of poly(phenylene ether) can comprise: dissolving a poly(phenylene ether) comprising 2,6-dimethyl-1,4-phenylene ether units, 2,3,6-trimethyl-1,4-phenylene ether units, 3,3',5,5'-tetramethyl-4,4'-dihydroxybiphenyl ether units, or a combination thereof in a mixture of 1,2-dichloroethane and a cosolvent to form a solvent mixture in a mixing vessel, wherein the cosolvent comprises at least one of methyl ethyl ketone, diethyl ether, methyl ethyl sulfone, ethyl acetate, or tetramethylene sulfone; combining a sulfonating agent with the solvent mixture, wherein the sulfonating agent reacts with the poly (phenylene ether) to form sulfonated poly(phenylene ether); precipitating the sulfonated poly(phenylene ether); and filtering (Continued)

tering the precipitated sulfonated poly(phenylene ether) to form a sulfonated poly(phenylene ether) precipitate and a filtrate; wherein the sulfonated poly(phenylene ether) has a sulfonation level of 20 to 50%.

19 Claims, 4 Drawing Sheets

(51) Int. Cl.
| | |
|---|---|
| B01D 71/52 | (2006.01) |
| C08J 5/22 | (2006.01) |
| H01M 8/10 | (2016.01) |
| H01M 8/1025 | (2016.01) |

(52) U.S. Cl.
CPC ......... *C08J 5/2256* (2013.01); *C08J 2371/12* (2013.01); *H01M 8/1025* (2013.01); *H01M 2008/1095* (2013.01)

(56) References Cited

U.S. PATENT DOCUMENTS

| | | | |
|---|---|---|---|
| 5,348,569 | A | 9/1994 | Bikson et al. |
| 6,103,414 | A | 8/2000 | Mittelsteadt et al. |
| 6,462,095 | B1 | 10/2002 | Boensel et al. |
| 6,933,068 | B2 | 8/2005 | Asano et al. |
| 8,133,305 | B2 | 3/2012 | Lackner et al. |
| 9,624,111 | B2 | 4/2017 | Novek |
| 2010/0218507 | A1 | 9/2010 | Cherson |
| 2018/0078907 | A1 | 3/2018 | Yoshimune et al. |
| 2019/0077919 | A1 | 3/2019 | Maletzko et al. |
| 2023/0167343 | A1 | 6/2023 | Mhetar et al. |
| 2024/0216874 | A1 | 7/2024 | Sekar et al. |

FOREIGN PATENT DOCUMENTS

| | | |
|---|---|---|
| CN | 103219533 B | 9/2015 |
| CN | 103236553 B | 8/2016 |
| CN | 103985890 B | 2/2017 |
| CN | 113248759 A | 8/2021 |
| EP | 1619735 A1 | 1/2006 |
| EP | 1636027 B1 | 1/2013 |
| EP | 4015070 A1 | 6/2022 |
| JP | 2004273286 | 9/2004 |
| JP | 2005174897 | 6/2005 |
| JP | 2006231095 A | 9/2006 |
| JP | 2007115446 | 5/2007 |
| JP | 2010269229 A | 12/2010 |
| JP | 2013094744 A | 5/2013 |
| JP | 5628015 B2 | 10/2014 |
| JP | 2018044031 A | 3/2018 |
| WO | 2008144708 A1 | 11/2008 |
| WO | 2019009721 A1 | 1/2019 |

OTHER PUBLICATIONS

Kosmala, B.; Schauer, J. Ion-Exchange Membranes Prepared by Blending Sulfonated Poly(2,6-dimethyl-1,4-phenylene oxide) with Polybenzimidazole. Journal of Applied Polymer Science, vol. 85, 1118-1127 (2002) (Year: 2002).*
Howe, G.P. "Solvent transport, storage, recovery and disposal" in Directory of Solvents. ed B. P. Whim and P. G. Johnson. Chapman & Hall, 1996. pp. 127-157. DOI: 10.1007/978-94-009-1549-7 (Year: 1996).*
Xu, T.; Wu, D.; Wu, L. Poly(2,6-dimethyl-1,4-phenylene oxide) (PPO)—A versatile starting polymer for proton conductive membranes (PCMs). Progress in Polymer Science 33 (2008) 894-915 (Year: 2008).*
Machine translation of JP 2004273286. (Year: 2004).*
Machine translation of WO 2019009721. (Year: 2019).*
Acosta et al.; "Characterization of Polymer Systems based on Sulfonated Poly(2,6-dimethyl-1,4-phenylene oxide)"; Society of Chemical Industry, Polymer International, vol. 49; 2000; pp. 1534-1538.
European Search Report for EP Application No. 19180758.5 filed on Jun. 18, 2019; Date of mailing: Nov. 13, 2019; 9 pages.
Fu et al.; "Studies on the Sulfonation of Poly(phenylene oxide) (PPO) and Permeation Behavior of Gases and Water Vapor Through Sulfonated PPO Membranes. I. Sulfonation of PPO and Characterization of the Products"; Journal of Applied Polymer Science, vol. 51; 1994; pp. 1399-1404.
Guan et al.; "Development and Characterization of Homogeneous Membranes Prepared from Sulfonated Poly (phenylene oxide)"; Journal of Applied Polymer Science, vol. 98; 2005; pp. 1244-1250.
Huang et al.; "Synthesis and Transport Properties of Thin Film Composite Membranes. I. Synthesis of Poly (phenylene Oxide) Polymer and Its Sulfonation"; Journal of Applied Polymer Science, vol. 29; 1984; pp. 4017-4027.
International Search Report for International Application No. PCT/IB2020/054535; International Filing Date: May 13, 2020; Date of Mailing: Jul. 2, 2020; 6 pages.
Kruczek et al.; "Development and Characterization of Homogeneous Membranes de from High Molecular Weight Sulfonated Polyphenylene Oxide"; Journal of Membrane Science, vol. 146; 1998, pp. 263-275.
Wang et al.; "Preparation and Characterization of Sulfonated Poly(phenylence oxide)"; Polymer Journal, vol. 27, No. 2; 1995; pp. 173-178.
Written Opinion of the International Searching Authority for International Application No. PCT/IB2020/054535; International Filing Date May 13, 2020; Date of Mailing: Jul. 2, 2020; 9 pages.
Xu et al.; "Effect of Solvent Composition on the Sulfonation Degree of Poly(phenylene oxide)(PPO)"; Chinese Journal of Polymer Science, vol. 20, No. 1; 2002; pp. 53-57.
Baker; Future Directions of Membrane Gas Separation Technology; Ind. Eng. Chem. Res., vol. 41, No. 6; 2002; pp. 1393-1411.
Yoshimune et al., "CO2/CH4 mixed gas separation using carbon hollow fiber membranes," Energy Procedia, 2013, pp. 1109-1116, vol. 37.
Yoshimune et al., "Flexible carbon hollow fiber membranes derived from sulfonated poly(phenylene oxide)," Separation and Purification Technology, 2010, pp. 193-197, vol. 75.
Written Opinion of the ISA/EPO for International Application No. PCT/IB2023/052769; dated Jun. 7, 2023; 6 pages.

* cited by examiner

METHODS FOR MAKING SULFONATED POLY(PHENYLENE ETHER) AND ARTICLES MADE THEREFROM

CROSS REFERENCE TO RELATED APPLICATIONS

This application is a National Stage application of PCT/IB2020/054535, filed May 13, 2020 which claims the benefit of European Application No. 19180758.5, filed Jun. 18, 2019, both of which are incorporated by reference in their entirety herein.

BACKGROUND

Disclosed herein is a method for making sulfonated poly(phenylene ether).

Poly(phenylene ether)s are commercially attractive materials because of their unique combination of physical, chemical, and electrical properties. Furthermore, the combination of poly(phenylene ether)s with other polymers or additives provides blends which result in improved overall properties including chemical resistance, high strength, and high flow. As new commercial applications are explored, various sulfonated grades of poly(phenylene ether) materials are desired.

Conventional methods for sulfonating poly(phenylene ether) develop heterogeneity with progressive levels of sulfonation, affection the reaction system making further sulfonation impossible.

What is needed in the art is a scalable process for sulfonating poly(phenylene ether) up to sulfonation levels of 50%, and preferably with improved efficiency.

BRIEF SUMMARY

Disclosed herein are method for sulfonating poly(phenylene ether).

A method for sulfonation of poly(phenylene ether) can comprise: dissolving a poly(phenylene ether) comprising 2,6-dimethyl-1,4-phenylene ether units, 2,3,6-trimethyl-1,4-phenylene ether units, 3,3',5,5'-tetramethyl-4,4'-dihydroxybiphenyl ether units, or a combination thereof in a mixture of 1,2-dichloroethane and a cosolvent to form a solvent mixture in a mixing vessel, wherein the cosolvent comprises at least one of methyl ethyl ketone, diethyl ether, methyl ethyl sulfone, ethyl acetate, or tetramethylene sulfone; combining a sulfonating agent with the solvent mixture, wherein the sulfonating agent reacts with the poly(phenylene ether) to form sulfonated poly(phenylene ether); precipitating the sulfonated poly(phenylene ether); and filtering the precipitated sulfonated poly(phenylene ether) to form a sulfonated poly(phenylene ether) precipitate and a filtrate; wherein the sulfonated poly(phenylene ether) has a sulfonation level of 20 to 50%.

BRIEF DESCRIPTION OF THE DRAWINGS

Referring now to the drawings which are exemplary and not limiting.

DETAILED DESCRIPTION

Figure 1:
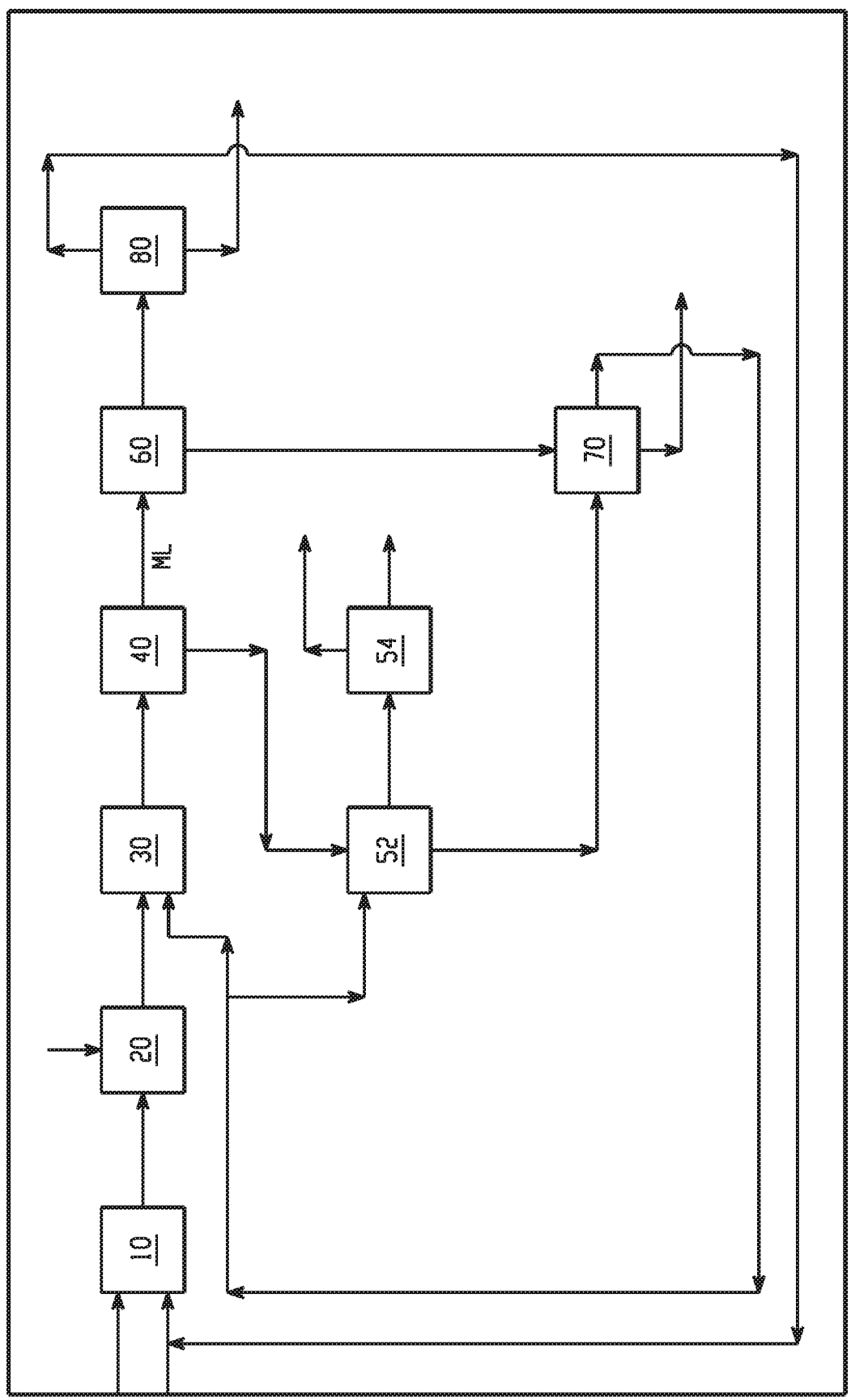
FIG. 1 is a schematic drawing of an embodiment of a system for sulfonating poly(phenylene ether).

Methods have been developed to reliably sulfonate of poly(phenylene ether) to degrees of sulfonation ranging from 20 to 50%. The process is scalable and allows for the production of poly(phenylene ether) with different sulfonation levels. For example, methods enable sulfonating poly(phenylene ether) up to sulfonation levels of 50%, while maintaining homogeneity, and preferably recovering and recycling the solvents. The same was achieved using reaction solvent mixtures comprising 1,2-dichloroethane and a co-solvent (e.g., at least one of ethyl acetate or tetramethylene sulfone). Presence of the co-solvent enables reaction homogeneity at progressive levels of sulfonation of the polyphenylene oxide involving comparatively high stoichiometric amounts of the sulfonating agent (e.g., chloro-sulfonic acid). For example, polyphenylene oxide can be sulfonated between 20 to 50% while maintaining a homogeneous system.

It has been determined that inhibiting precipitation during sulfonation enables the controlling of the sulfonation level. Preferably, to make this process scalable and efficient, effective handling of the effluent from the process is important. In the present methods, the solvent is recoverable and recyclable at a rate of greater than or equal to 80 weight percent (wt %), based upon a total weight of the solvent introduced into the system.

With the ability to efficiently produce poly(phenylene ether) with sulfonation levels of 20 to 50%, various diverse products are possible. For example, ion exchange membranes for dialysis, proton conducting membranes for polymer electrolyte membrane fuel cells, ion exchange membranes for flow batteries, hollow fiber membranes, precursor for molecular sieve carbon membranes for gas separation, precursor for carbon electrodes for fuel cells, carbon membrane reactors, etc.

The degree of sulfonation can be controlled by adjusting an amount of solvent, and in particular, cosolvent, in the process and by the amount of sulfonating agent used. The process comprises dissolving poly(phenylene ether) in a solvent, adding a sulfonating agent to the mixture, and sulfonating the poly(phenylene ether). The solvent comprises 1,2-dichloroethane. The cosolvent comprises at least one of methyl ethyl ketone, diethyl ether, methyl ethyl sulfone, ethyl acetate (EA), or tetramethylene sulfone; preferably comprises at least one of ethyl acetate, or tetramethylene sulfone, and more preferably comprises ethyl acetate.

Poly(phenylene ether)s include those comprising repeating structural units having the formula

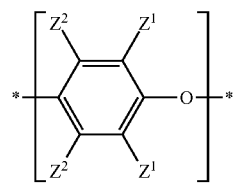

wherein each occurrence of $Z^1$ independently comprises halogen, unsubstituted or substituted $C_1$-$C_{12}$ hydrocarbyl provided that the hydrocarbyl group is not tertiary hydrocarbyl. $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ independently comprises hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of 0.03 to 2 deciliter per gram (dl/g). For example, the poly(phenylene ether) can have an intrinsic viscosity of 0.25 to 1.7 dl/g, specifically 0.25 to 0.7 dl/g, more specifically 0.35 to 0.55 dl/g, even more specifically 0.35 to 0.50 d/g, measured at 25° C. in chloroform using an Ubbelohde viscometer.

In some embodiments, the poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly (phenylene ether) can be in the form of a homopolymer, a copolymer, a graft copolymer, an ionomer, a block copolymer, or an oligomer as well as combinations thereof.

Poly(phenylene ether) as used herein can also refer to lower molecular weight phenylene ether oligomers. In some embodiments, the phenylene ether oligomer comprises 2,6-dimethyl-1,4-phenylene ether units, 2,3,6-trimethyl-1,4-phenylene ether units, or a combination thereof. In some embodiments, the phenylene ether oligomer can have an intrinsic viscosity of 0.03 to 0.13 deciliter per gram, or 0.05 to 0.1 deciliter per gram, or 0.1 to 0.15 deciliter per gram, measured at 25° C. in chloroform using an Ubbelohde viscometer. The phenylene ether oligomer can have a number average molecular weight of 500 to 7,000 grams per mole, and a weight average molecular weight of 500 to 15,000 grains per mole, as determined by gel permeation chromatography using polystyrene standards. In some embodiments, the number average molecular weight can be 750 to 4,000 grams per mole, and the weight average molecular weight can be 1,500 to 9,000 grams per mole, as determined by gel permeation chromatography using polystyrene standards.

The phenylene ether oligomer can be monofunctional or bifunctional. In some embodiments, the phenylene ether oligomer can be monofunctional. For example, it can have a functional group at one terminus of the polymer chains. The functional group can be, for example, a hydroxyl group or a (meth)acrylate group, preferably a (meth)acrylate group. In some embodiments, the phenylene ether oligomer comprises poly(2,6-dimethyl-1,4-phenylene ether).

In some embodiment, the phenylene ether oligomer can be bifunctional. For example, it can have functional groups at both termini of the oligomer chain. The functional groups can be, for example, hydroxyl groups or (meth)acrylate groups, preferably (meth)acrylate groups. Bifunctional polymers with functional groups at both termini of the polymer chains are also referred to as "telechelic" polymers. In some embodiments, the phenylene ether oligomer comprises a bifunctional phenylene ether oligomer having the structure

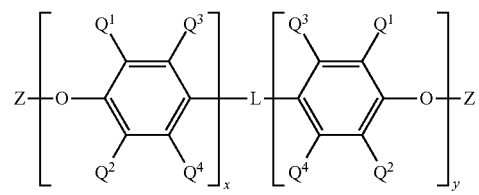

wherein $Q^1$ and $Q^2$ each independently comprise halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ independently comprise hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; Z is hydrogen or (meth)acrylate; x and y are independently 0 to 30, specifically 0 to 20, more specifically 0 to 15, still more specifically 0 to 10, even more specifically 0 to 8, provided that the sum of x and y is at least 2, specifically at least 3, more specifically at least 4; and L has the structure

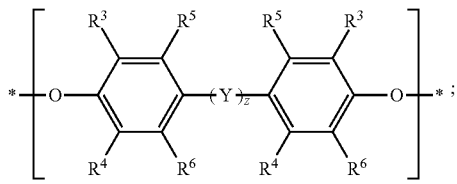

wherein each occurrence of $R^3$ and $R^4$ and R and $R^6$ independently comprises hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure comprising

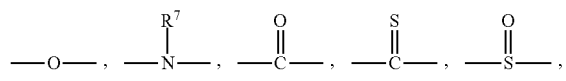

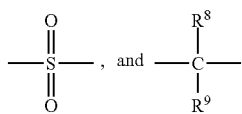

wherein each occurrence of $R^7$ independently comprises hydrogen and $C_1$-$C_{12}$ hydrocarbyl, and each occurrence of $R^8$ and $R^9$ independently comprises hydrogen, $C_1$-$C_{12}$ hydrocarbyl, and $C_1$-$C_6$ hydrocarbylene wherein $R^8$ and $R^9$ collectively form a $C_4$-$C_{12}$ alkylene group.

In an embodiment, the phenylene ether oligomer comprises a bifunctional phenylene ether oligomer having the structure

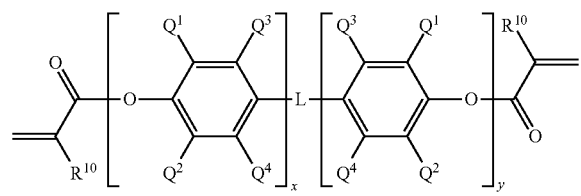

wherein $Q^1$, $Q^2$, $Q^3$, $Q^4$, L, x and y are as defined above
$R^{10}$ is methyl or hydrogen In the (meth)acrylate-terminated phenylene ether structure above, there are limitations on the variables x and y, which correspond to the number of phenylene ether repeating units at two different places in the bifunctional phenylene ether oligomer. In the structure, x and y are independently 0 to 30, specifically 0 to 20, more specifically 0 to 15, even more specifically 0 to 10, yet more specifically 0 to 8. The sum of x and y is at least 2, specifically at least 3, more specifically at least 4. A phenylene ether oligomer can be analyzed by proton nuclear magnetic resonance spectroscopy ($^1$H NMR) to determine whether these limitations are met, on average. Specifically, $^1$H NMR can distinguish between protons associated with internal and terminal phenylene ether groups, with internal and terminal residues of a polyhydric phenol, and with terminal residues as well. It is therefore possible to determine the average number of phenylene ether repeating units per molecule, and the relative abundance of internal and terminal residues derived from dihydric phenol.

In some embodiments the phenylene ether oligomer comprises a bifunctional phenylene ether oligomer having the structure

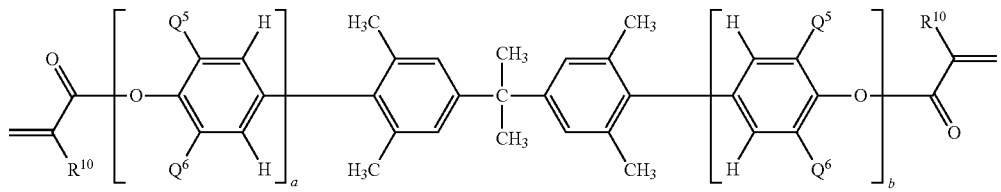

wherein each occurrence of $Q^5$ and $Q^6$ independently comprises methyl, di-n-butylaminomethyl, or morpholinomethyl; and each occurrence of a and b is independently 0 to 20, with the proviso that the sum of a and b is at least 2; and each occurrence of $R^{10}$ is methyl or hydrogen. An exemplary bifunctional phenylene ether oligomer includes NORYL™ Resin SA9000, available from SABIC Innovative Plastics.

In some embodiments the phenylene ether oligomer comprises a bifunctional phenylene ether oligomer having the structure

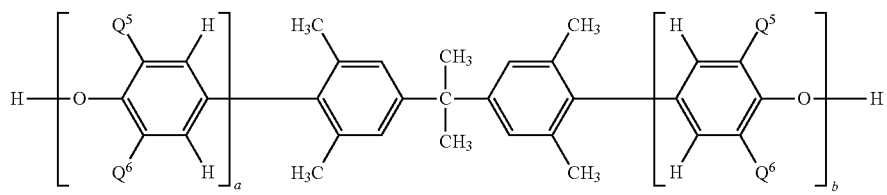

wherein each occurrence of $Q^5$ and $Q^6$ independently comprises methyl, di-n-butylaminomethyl, or morpholinomethyl; and each occurrence of a and b is independently 0 to 20, with the proviso that the sum of a and b is at least 2. An exemplary bifunctional phenylene ether oligomer includes NORYL™ Resin SA90, available from SABIC Innovative Plastics.

In some embodiments, the poly(phenylene ether) comprises a poly(phenylene ether) homopolymer, oligomer, or combination thereof. The poly(phenylene ether) can preferably comprise a poly(2,6-dimethyl-1,4-phenylene ether).

The poly(phenylene ether) composition can optionally further comprise one or more additives, with the proviso that the one or more additives do not significantly adversely affect one or more desirable properties of the poly(phenylene ether) composition). Exemplary additives can include stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof. When present, such additives are typically used in a total amount of less than or equal to 10 weight percent, specifically less than or equal to 5 weight percent, based on the total weight of the poly(phenylene ether) composition.

The process for the sulfonation of the poly(phenylene ether) comprises dissolving the poly(phenylene ether) in a solvent (preferably in a solvent and cosolvent) to form a solvent mixture. The mixing can be performed at temperatures of 10° C. to 60° C., e.g., 25° C. to 40° C. The 1,2-dichloroethane is present in a sufficient quantity to dissolve the poly(phenylene ether). The amount of cosolvent is sufficient to prevent precipitation of the sulfonated poly(phenylene ether) before the desired degree of sulfonation has been attained. The solvent mixture can comprise 1 wt % to 20 wt %, preferably 5 wt % to 10 wt %, poly(phenylene ether); 80 wt % to 99 wt %, preferably 90 wt % to 95 wt % 1,2-dichloroethane; and, 0 to 10 wt % (e.g., greater than zero), preferably greater than 0 to 6.0 wt %, cosolvent; based upon 100 wt % weight of the solvent mixture. The amount of cosolvent is determined based upon the desired degree of sulfonation. For example, for sulfonation of 10 to 20%, the solvent mixture can comprise 1 wt % to 20 wt %, preferably 5 wt % to 10 wt %, poly(phenylene ether); 80 wt % to 99 wt %, preferably 90 wt % to 95 wt % 1,2-dichloroethane; no cosolvent is necessary. However, for uniform sulfonation above 20%, the presence of cosolvent is desirable. For example, for a uniform sulfonation level of 25% to 50%, the solvent mixture can comprise 1 wt % to 10 wt %, preferably 5 wt % to 10 wt %, poly(phenylene ether); 70 wt % to 90 wt %, preferably 80 wt % to 90 wt % 1,2-dichloroethane, and 1 to 10 wt % preferably 2 to 6.0 wt %, cosolvent; based upon 100 wt % weight of the solvent mixture.

The solvent mixture can then be reacted with a sulfonating agent to sulfonate the poly(phenylene ether). The sulfonation can be performed at a temperature of up to 85° C., e.g., 10° C. to 60° C., or 25° C. to 40° C. The amount of sulfonating agent added to the solvent mixture can be 0.5 to 1 mole, preferably 0.25 to 0.9 moles, based upon a total 1 mole of poly(phenylene ether) that was dissolved in the solvent mixture. The specific amount of sulfonating agent added is dependent upon the desired level of sulfonation in the sulfonated reaction product. Desirably, the sulfonating agent is added slowly to the solvent mixture, e.g., added over a period of 15 minutes (min.) to 60 min., (e.g., over a period of 30 ruins). Once the sulfonating agent is added to the solvent mixture, the solvent mixture can be stirred, e.g., for a period of time of 60 to 210 mins, prior to proceeding to precipitation.

Once the poly(phenylene ether) has been sulfonated, the sulfonated poly(phenylene ether) can be precipitated from the solvent mixture using an anti-solvent mixture. e.g., containing di-ionized (DI) water. For example, at least one of hexane, heptane, can be used, e.g., along with di-ionized water, to cause the sulfonated poly(phenylene ether) to precipitate out of the reaction solvent mixture. The reaction solvent mixture can be (e.g., slowly) added to the anti-solvent mixture, wherein the anti-solvent mixture can be used in an amount sufficient to induce precipitation. For example, 100 grains (g) solvent mixture can be added to 300 g to 700 g, preferably 390 g to 595 g. of the anti-solvent mixture with hexane to water weight ratios ranging from 0 to 1.15.

The precipitated sulfonated poly(phenylene ether) can be filtered, and optionally washed and dried. The filtrate can be diphasic with the 1,2-dichloroethane, cosolvent, and optionally organic(s) (e.g., hexane) that were part of the anti-solvent mixture, as the organic phase and water as the aqueous phase. Hence, the filtrate can be further processed to recover at least one of the 1,2-dichloroethane, the cosolvent, or water; preferably to recover 1,2-dichloroethane and the cosolvent, more preferably to recover 1,2-dichloroethane, the cosolvent, and the water. Recovering the materials can comprise decanting the diphasic filtrate to form an aqueous stream and an organic stream. The organic stream can be further processed, e.g., distilled, to recover the 1,2-dichloroethane and/or the cosolvent. The recovered materials can be recycled.

Referring now to FIG. 1 where the process is schematically illustrated. As is illustrated, the process entails introducing poly(phenylene ether), 1,2-dichloroethane, to a mixing vessel 10. The mixing vessel can be maintained at room temperature up to 85° C., e.g., 30° C. to 60° C., preferably 30° C. to 45° C. Within the mixing vessel 10, the poly(phenylene ether), 1,2-dichloroethane, and a cosolvent, can be mixed, e.g., until homogenous, to form the solvent mixture. Optionally, the mixing can continue until a homogenous clear solution is obtained. From the mixing vessel 10, the solvent mixture can be processed in a reaction vessel 20 along with a sulfonating agent. The sulfonated poly(phenylene ether) can then be precipitated from the mixture in a precipitation unit 30, e.g., once the desired degree of sulfonation has been attained. For example, the reaction solvent mixture can be slowly added to the anti-solvent mixture (e.g., of hexane and DI water) to induce precipitation of the sulfonated poly(phenylene ether). The precipitated sulfonated poly(phenylene ether) can be separated from the liquid phase, e.g., in filtration unit 40, before the sulfonated poly(phenylene ether) is optionally washed (such as with DI water), e.g., in wash units 50,52, and dried, e.g., in drier 54. Meanwhile, the liquid phase from the filtration unit 40 can be processed to remove water, e.g., in decantation unit 60 using liquid-liquid separation. The aqueous recovery phase from the decantation unit 60 can be processed in a multiple effect evaporator (MEE) 70 to recover the water. The resulting water can optionally be recycled, e.g., to, the wash unit 52, or the precipitation unit 30. The 1,2-dichloroethane (EDC) stream from the decantation unit 60 can be further processed to separate the EDC by distillation in unit 80. The separated EDC can optionally be recycled, e.g., to mixing vessel 10.

Figure 2:
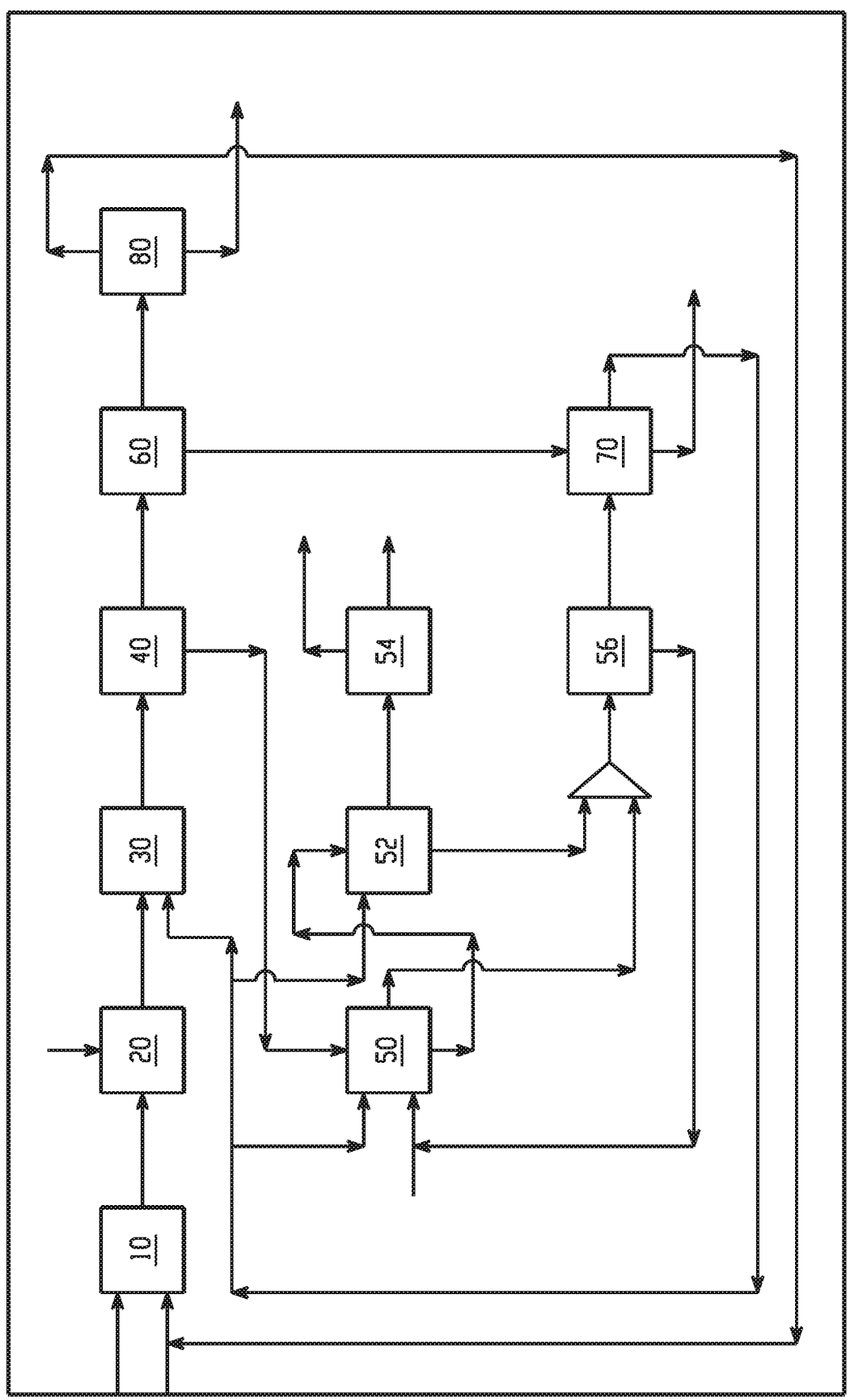
FIG. 2 is a schematic drawing of another embodiment of a system for sulfonating poly(phenylene ether).

Referring now to FIG. 2, where the process is schematically illustrated. As is illustrated, the process entails introducing poly(phenylene ether), 1,2-dichloroethane, and a cosolvent (ethyl acetate here), to a mixing vessel 10. The mixing vessel can be maintained at room temperature up to 85° C., e.g., 30° C. to 60° C., preferably 30° C. to 45° C. Within the mixing vessel 10, the poly(phenylene ether), 1,2-dichloroethane, and a cosolvent, can be mixed, e.g., until homogenous, to form the solvent mixture. Optionally, the mixing can continue until a homogenous clear solution is obtained. From the mixing vessel 10, the solvent mixture can be processed in a reaction vessel 20 along with a sulfonating agent. The sulfonated poly(phenylene ether) can be precipitated from the mixture in a precipitation unit 30, e.g., once the desired degree of sulfonation has been attained. For example, the reaction solvent mixture can be slowly added to the anti-solvent mixture (e.g., DI water) to induce precipitation of the sulfonated poly(phenylene ether). The precipitated sulfonated poly(phenylene ether) can be separated from the liquid phase, e.g., in filtration unit 40, before the sulfonated poly(phenylene ether) is optionally be reslurried with a DI water-hexane mixture, e.g., followed by a wash (e.g., with DI water) in units 50,52, and dried, e.g., in drier 54. The wash from the wash units 50,52 can optionally be separated in decantation unit 56, into an aqueous stream and a hexane stream. The hexane stream can optionally be recycled to the reslurry unit 50. Meanwhile, the liquid phase from the filtration unit 40 can be processed to remove water, e.g., in decantation unit 60 using liquid-liquid separation. The aqueous phase from the decantation unit 60 and from decantation unit 56, can be processed in the multiple effect evaporator 70 to recover the water. The resulting water can optionally be recycled, e.g., to the reslurry unit 50, the wash unit 52, or the precipitation unit 30; and preferably to the reslurry unit 50. The EDC stream from the decantation unit 60 can be further processed to separate the EDC, e.g., from organic(s) and/or residue by distillation in the unit 80. The separated EDC can optionally be recycled, e.g., to mixing vessel 10.

Figure 3:
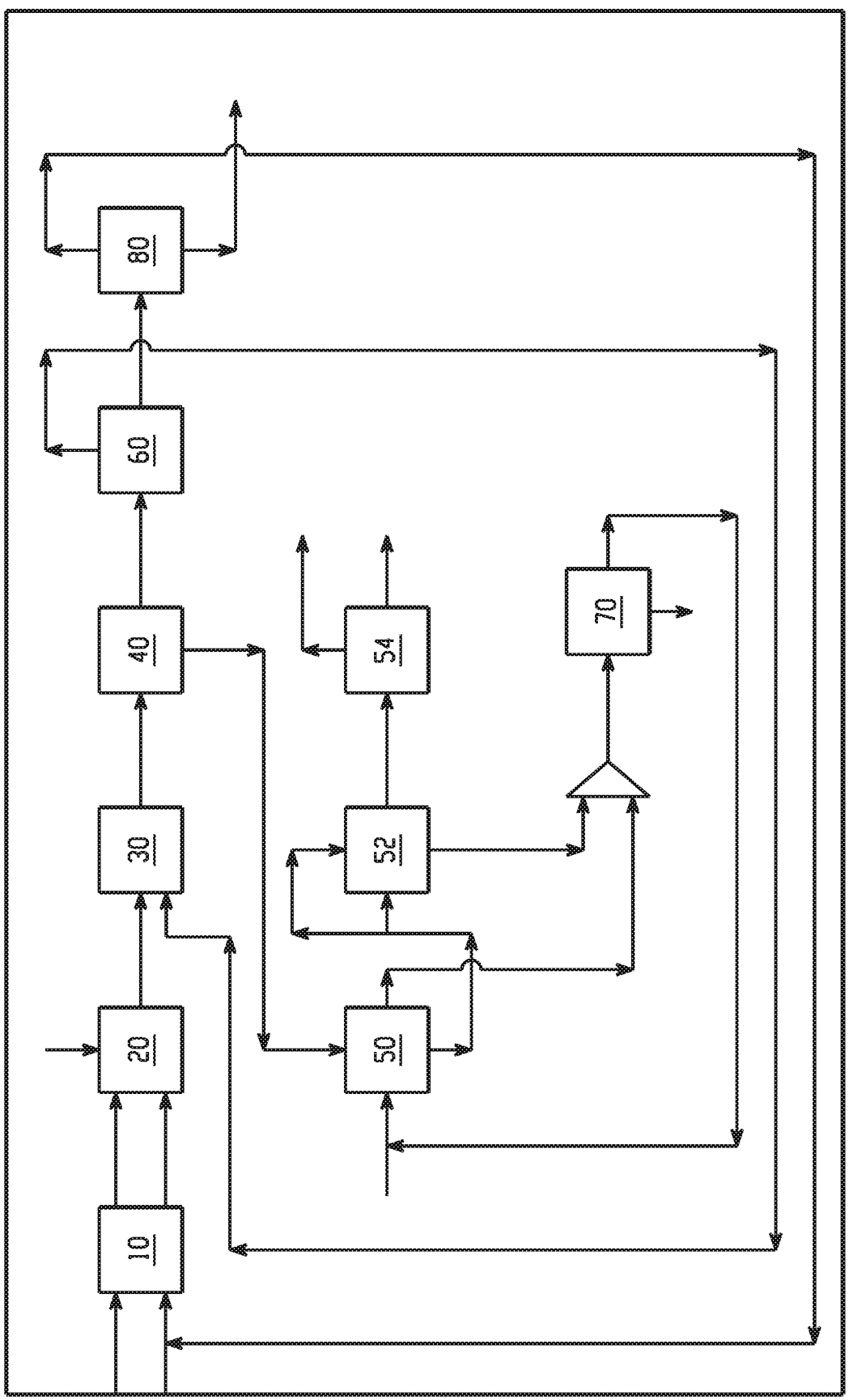
FIG. 3 is a schematic drawing of another embodiment of a system for sulfonating poly(phenylene ether).

Referring now to FIG. 3, where the process is schematically illustrated. As is illustrated, the process entails introducing poly(phenylene ether), 1,2-dichloroethane, and a cosolvent (e.g., tetramethylene sulfone), to a mixing vessel 10. The mixing vessel can be maintained at room temperature up to 85° C. e.g. 30° C. to 60° C. preferably 30° C. to 45° C. Within the mixing vessel 10, the poly(phenylene ether), 1,2-dichloroethane, and cosolvent, can be mixed, e.g., until homogenous, to form the solvent mixture. Optionally, the mixing can continue until a homogenous clear solution is obtained. From the mixing vessel 10, the solvent mixture can be processed in a reaction vessel 20 along with a sulfonating agent. The sulfonated poly(phenylene ether) can be precipitated from the mixture in a precipitation unit 30, e.g., once the desired degree of sulfonation has been attained. For example, the reaction solvent mixture can be slowly added to the DI water (used as the anti-solvent mixture) to induce precipitation of the sulfonated poly(phenylene ether). The precipitated sulfonated poly(phenylene ether) can be separated from the liquid phase, e.g., in filtration unit 40, before the sulfonated poly(phenylene ether) is optionally reslurried in DI water-hexane mixture, e.g., followed by a wash (e.g., with DI water) in units 50,52, and dried, e.g., in drier 54. The wash from the wash units 50,52 can optionally be separated in decantation unit 56, into an aqueous stream and hexane stream. The hexane stream can optionally be recycled to the reslurry unit 50. Meanwhile, the liquid phase from the filtration unit 40 can be processed to remove water, e.g., in decantation unit 60 using liquid-liquid separation. The aqueous phase from the decantation unit 60 and from decantation unit 56, can be processed in the multiple effect evaporator 70 to recover the water. The resulting water can optionally be recycled, e.g., to the reslurry unit 50, the wash unit 52, or the precipitation unit 30; and preferably to the reslurry unit 50. The EDC stream from the decantation unit 60 can be further processed to separate the EDC, e.g., from organic(s) and/or residue by distillation in the unit 80. The separated EDC can optionally be recycled, e.g., to mixing vessel 10.

This disclosure is further illustrated by the following examples, which are non-limiting.

EXAMPLES

Example 1: Simulated Method of Making Sulfonated Polyphenylene Ether (sPPE) with Ion Exchange Capacity (IEC) of 1.5-1.6 Milliequivalent Per Gram (Meq/g)

The scheme is illustrated in FIG. 1.

A 3-necked round bottom glass flask equipped with a TEFLON stirrer, a reflux condenser and a pressure equalized dropping funnel was maintained at 35° C. 10.0 grams (g) of NORYL PPO™ 646 poly(phenylene ether) resin (commercially available from SABIC) was dissolved in 95 g of 1,2-dichloroethane (EDC) until a homogenous clear solution was obtained; 60 minutes (min.). The temperature was subsequently reduced to 25° C. 2.37 g of chlorosulfonic acid was transferred to a pressure equalized dropping funnel and the same was added into the 1,2-dichloroethane solution under vigorous stirring over a 30 minute period. A 5 g rinse 1,2-dichloroethane was used to flush the dropping funnel. A nitrogen purge was maintained although with rapid stirring. At the end of this addition, the stirred solution becomes slightly cloudy. Stirring was continued for ab additional 60 minutes at 25° C. The reaction mass is subsequently slowly transferred along with hexane-deionized (DI) water ((350 milliliters (ml):200 ml) anti-solvent mixture) to a 2 liter (L) baffled precipitation vessel maintained at 10° C. and fitted with a 4-blade agitator of about 60 millimeter (mm) diameter, running at 1,000 revolutions per minute (rpm) giving a tip-speed of 3.14 meters per second (m/s). The temperature was subsequently ramped up to 25° C. after 1 hour. The stirring was continued for a total of 8 hours. This was followed by filtration. The residue (sulfonated poly(phenylene ether) (sPPE)) was then reslurried in DI water and refiltered. The residue washed thoroughly with DI water until neutral pH. The sulfonated material was then dried under vacuum for 48 hours (h) at room temperature.

The industrial process scheme for the manufacture of sulfonated polyphenylene ether (sPPE) includes the dissolution of polyphenylene either (PPE) in 1,2-dichloroethane (basis of 100 kilogram per hour (kg/hr) of poly(phenylene ether)) with a residence time of 10 to 15 minutes. Dissolved 1,2-dichloroethane enters the reaction vessel where the reaction with chlorosulfonic acid (23.7 kg/hr) takes place with the mole ratio of chlorosulfonic acid to poly(phenylene ether) of 0.249. The reaction temperature is at 25° C. with the residence time of 30 mins. The hydrochloride (HCl) gas which is evolved during the process is vented from the reactor and scrubbed using an alkali scrubber. The reaction mass from the reactor is precipitated in a precipitation vessel with starting poly(phenylene ether) to anti-solvent mixture volume ratio of 1:55.

The precipitated mass is filtered and the wet sPPE goes for the purification by passing through two wash vessels and dried in a drier at the temperature of 50 to 60° C. at reduced pressure of 100 millimeters of mercury (mmHg). The filtrate is biphasic with 1,2-dichloroethane (EDC) and hexane being the organic phase and water as the aqueous phase. Decanting (liquid-liquid separation) is done to separate the EDC layer from the water followed by distillation to separate EDC from heavies. EDC formed heterogeneous azeotrope with water. The distillation operation separates EDC as a distillate (which can be recycled), and the organic heavies at the bottom. The recycle efficiency for water and solvent is more than 90%. The entire scheme was simulated in Aspen to understand the recovery and recycle.

Example 2: Simulated Method of Making sPPE with IEC of 1.8-2.0 Meg/g

The scheme is illustrated in FIG. 2.

A 3-necked round bottom glass flask equipped with a TEFLON stirrer, a reflux condenser and a pressure equalized dropping funnel was maintained at 40° C. 10.0 g of NORYL PPO™ 646 poly(phenylene ether) resin was dissolved in a 1,2-dichloroethane and ethyl acetate (EA) (179.5 g:11.7 g) mixture until a homogenous clear solution was obtained; 60 min. The temperature was maintained at 40° C. 5.85 g of chlorosulfonic acid was transferred to a pressure equalized dropping funnel and the same was added into the 1,2-dichloroethane-ethylacetate solution mixture under vigorous stirring over a 30 minute period. A nitrogen purge was maintained through with rapid stirring. At the end of this addition, the stirred solution becomes slightly cloudy. Stirring was continued for an additional 210 minutes at 40° C. The reaction mass was subsequently slowly transferred along with 1,200 ml of DI water (e.g., as the anti-solvent mixture) to a 2 L baffled precipitation vessel maintained at 10° C. and fitted with a 4-blade agitator of about 60 mm diameter, running at 1,000 rpm giving a tip-speed of 3.14 m/s. The temperature was subsequently ramped up to 25° C. after 1 hour. The stirring was continued for a total of 30 mins. This was followed by filtration. The residue (sulfonated PPO) was then reslurried in DI water-hexane (500 ml:70 ml) mixture and refiltered. The residue was washed thoroughly with DI water until neutral pH. The sulfonated material is then dried under vacuum for 48 hours at room temperature.

The industrial process scheme for the manufacture of sulfonated PPO (sPPE) includes dissolution of poly(phenylene ether) in 1,2-eichloroethane and ethyl acetate (basis of 100 kg/hr of poly(phenylene ether)) in the amount of 89.2 wt % EDC, 4.97 wt % poly(phenylene ether) and 5.83 wt % EA, based upon a total weight of the poly(phenylene ether), EA, and EDC, with a residence time of 10 to 15 minutes. Dissolved poly(phenylene ether) goes to the reaction vessel where the reaction with chlorosulfonic acid (58.5 kg/hr) takes place with the mole ratio of chlorosulfonic acid to poly(phenylene ether) of 0.613. The reaction temperature is at 40° C. with the residence time of 30 mins. The HCl gas which is evolved during the process is vented from the reactor and scrubbed using alkali scrubber. The reaction mass from the reactor is precipitated in a precipitation vessel with starting poly(phenylene ether):water volume ratio of 1:120.

The precipitated mass is filtered and the wet sPPE goes for the purification by passing through two wash vessels and dried in a drier at the temperature of 50 to 60° C. at reduced pressure of 100 millimeters of mercury (mm-g). The filtrate is biphasic with 1,2-dichloroethane and EA being the organic phase and water as an aqueous phase. Decanting (liquid-liquid separation) is done to separate the EDC and EA from water followed by distillation to separate EDC and EA. Both EDC and EA forms heterogeneous azeotrope with water. The distillation operation separates EDC and EA as a distillate which can be recycled and the organic heavies at the bottom. The recycle efficiency for water and solvent is more than 90%. The entire scheme was simulated in Aspen to understand the recovery and recycle.

Example 3: Simulated Method of Making sPPE with IEC of 1.8-2.0 Meq/g

The scheme is illustrated in FIG. 2.

A 3-necked round bottom glass flask equipped with a TEFLON stirrer, a reflux condenser and a pressure equalized dropping funnel was maintained at 40° C. 10.0 g of NORYL PPO™ 646 poly(phenylene ether) resin was dissolved in a 1,2-dichloroethane and ethyl acetate (93.9 g:6.12 g) mixture until a homogenous clear solution was obtained; 60 min. The temperature was maintained at 40° C. Chlorosulfonic acid (5.9 g) was transferred accurately to a pressure equalized dropping funnel and the same was added into the 1,2-dichiloroethane and ethyl acetate mixture under vigorous stirring over a 30-min period. A nitrogen purge was maintained although with rapid stirring. At the end of this addition, the stirred solution becomes slightly cloudy. Stirring was continued for an additional 210 minutes at 40° C. The reaction mass is subsequently slowly transferred along with 500 ml of DI water (used as the anti-solvent mixture) to a 2 L baffled precipitation vessel maintained at 10° C. and fitted with a 4-blade of agitator of approximately 60 mm diameter, running at 1,000 rpm giving a tip-speed of 3.14 m/s. The temperature was subsequently ramped up to 25° C. after 1 hour. The stirring was continued for a total of 30 min. This was followed by filtration. The residue (sPPE) is then reslurried in DI water/hexane (435 ml:65 ml) mixture and refiltered. The residue washed thoroughly with DI water until neutral pH. The sulfonated poly(phenylene ether) is then dried under vacuum for 48 hours at room temperature.

The industrial process scheme for the manufacture of sulfonated poly(phenylene ether) includes the dissolution of poly(phenylene ether) in 1,2-dichloroethane and ethyl acetate (basis ~100 kg/hr of poly(phenylene ether)) in the amount of 85.33 wt % EDC, 9.09 wt % poly(phenylene ether) and 5.58 wt % EA with a residence time of 10 to 15 minutes. Dissolved poly(phenylene ether) is introduced to the reaction vessel where the reaction with chlorosulfonic acid (59.1 kg/hr) takes place with the mole ratio of 0.62 with respect to poly(phenylene ether). The reaction temperature is at 40° C. and the residence time is 30 mm. The HCl gas, which is evolved during the process, is vented from the reactor and scrubbed using an alkali scrubber. The reaction mass from the reactor is precipitated in a precipitation vessel with poly(phenylene ether):water volume ratio of 1:50.

The precipitated mass is filtered and the wet sPPE is purified by passing through two wash vessels and is dried in a drier at the temperature of 50 to 60° C. at reduced pressure of 100 mmHg. The filtrate is biphasic with 1,2-dichloroethane and EA being the organic phase and water as the aqueous phase. Decanting (liquid-liquid separation) is done to separate the EDC and EA from the water followed by distillation to separate the EDC and the EA. Both EDC and EA form heterogeneous azeotropes with water. The distillation operation separates the EDC and the EA as a distillate that can be recycled with organic heavies at the bottom. The recycle efficiency for water and solvent is more than 90%. The entire scheme was simulated in Aspen to understand the recovery and recycle.

Additional reactions were performed to determine a desired sulfonation reaction time after the addition of chlorosulfonic acid in Example 3. The scheme is illustrated in FIG. 2.

Example 4

A 3-necked round bottom glass flask equipped with a TEFLON stirrer, a reflux condenser and a pressure equalized dropping funnel was maintained at 40° C. 10.0 g of NORYL PPO™ 646 poly(phenylene ether) resin was dissolved in a 1,2-dichloroethane and ethyl acetate (93.9 g:6.12 g) mixture until a homogenous clear solution was obtained; 60 min. The temperature was maintained at 40° C. Chlorosulfonic acid (5.9 g) was transferred accurately to a pressure equalized dropping funnel and the same was added into the 1,2-dichloroethane and ethyl acetate mixture under vigorous stirring over a 30-min period. A nitrogen purge was maintained although with rapid stirring. At the end of this addition, the stirred solution becomes slightly cloudy. Stirring was continued for an additional 60 minutes at 40° C. The reaction mass is subsequently slowly transferred along with 500 ml of DI water (used as the anti-solvent mixture) to a 2 L baffled precipitation vessel maintained at 10° C. and fitted with a 4-blade of agitator of approximately 60 mm diameter, running at 1,000 rpm giving a tip-speed of 3.14 m/s. The temperature was subsequently ramped up to 25° C. after 1 hour. The stirring was continued for a total of 30 min. This was followed by filtration. The residue (sPPE) is then reslurried in DI water/hexane (435 ml:65 ml) mixture and refiltered. The residue washed thoroughly with DI water until neutral pH. The sulfonated material is then dried under vacuum for 48 hours at room temperature.

Example 5

A 3-necked round bottom glass flask equipped with a TEFLON stirrer, a reflux condenser and a pressure equalized dropping funnel was maintained at 40° C. 10.0 g of NORYL PPO™ 646 poly(phenylene ether) resin was dissolved in a 1,2-dichloroethane and ethyl acetate (93.9 g:6.12 g) mixture until a homogenous clear solution was obtained; 60 min. The temperature was maintained at 40° C. Chlorosulfonic acid (5.9 g) was transferred accurately to a pressure equalized dropping funnel and the same was added into the 1,2-dichloroethane and ethyl acetate mixture under vigorous stirring over a 30-min period. A nitrogen purge was maintained although with rapid stirring. At the end of this addition, the stirred solution becomes slightly cloudy. Stirring was continued for an additional 120 minutes at 40° C. The reaction mass is subsequently slowly transferred along with 500 ml of DI water (used as the anti-solvent mixture) to a 2 L baffled precipitation vessel maintained at 10° C. and fitted with a 4-blade of agitator of approximately 60 mm diameter, running at 1,000 rpm giving a tip-speed of 3.14 m/s. The temperature was subsequently ramped up to 25° C. after 1 hour. The stirring was continued for a total of 30 min. This was followed by filtration. The residue (sPPE) is then reslurried in DI water/hexane (435 ml:65 ml) mixture and refiltered. The residue washed thoroughly with DI water until neutral pH. The sulfonated material is then dried under vacuum for 48 hours at room temperature.

Example 6

A 3-necked round bottom glass flask equipped with a TEFLON stirrer, a reflux condenser and a pressure equalized dropping funnel was maintained at 40° C. 10.0 g of NORYL PPO™ 646 poly(phenylene ether) resin was dissolved in a 1,2-dichloroethane and ethyl acetate (93.9 g:6.12 g) mixture until a homogenous clear solution was obtained; 60 min. The temperature was maintained at 40° C. Chlorosulfonic acid (5.9 g) was transferred accurately to a pressure equalized dropping funnel and the same was added into the 1,2-dichloroethane and ethyl acetate mixture under vigorous stirring over a 30-min period. A nitrogen purge was maintained although with rapid stirring. At the end of this addition, the stirred solution becomes slightly cloudy. Stirring was continued for an additional 180 minutes at 40° C. The reaction mass is subsequently slowly transferred along with 500 ml of DI water (used as the anti-solvent mixture) to a 2 L baffled precipitation vessel maintained at 10° C. and fitted with a 4-blade of agitator of approximately 60 mm diameter, running at 1,000 rpm giving a tip-speed of 3.14 m/s. The temperature was subsequently ramped up to 25° C. after 1 hour. The stirring was continued for a total of 30 min. This was followed by filtration. The residue (sPPE) is then reslurried in DI water/hexane (435 ml:65 ml) mixture and refiltered. The residue washed thoroughly with DI water until neutral pH. The sulfonated material is then dried under vacuum for 48 hours at room temperature.

Example 7

A 3-necked round bottom glass flask equipped with a TEFLON stirrer, a reflux condenser and a pressure equalized dropping funnel was maintained at 40° C. 10.0 g of NORYL PPO™ 646 poly(phenylene ether) resin was dissolved in a 1,2-dichloroethane and ethyl acetate (93.9 g:6.12 g) mixture until a homogenous clear solution was obtained; 60 min. The temperature was maintained at 40° C. Chlorosulfonic acid (5.9 g) was transferred accurately to a pressure equalized dropping funnel and the same was added into the 1,2-dichloroethane and ethyl acetate mixture under vigorous stirring over a 30-min period. A nitrogen purge was maintained although with rapid stirring. At the end of this addition, the stirred solution becomes slightly cloudy. Stirring was continued for an additional 210 minutes at 40° C. The reaction mass is subsequently slowly transferred along with 500 ml of DI water (used as the anti-solvent mixture) to a 2 L baffled precipitation vessel maintained at 10° C. and fitted with a 4-blade of agitator of approximately 60 mm diameter, running at 1,000 rpm giving a tip-speed of 3.14 m/s. The temperature was subsequently ramped up to 25° C. after 1 hour. The stirring was continued for a total of 30 min. This was followed by filtration. The residue (sPPE) is then reslurried in DI water/hexane (435 ml:65 ml) mixture and refiltered. The residue washed thoroughly with DI water until neutral pH. The sulfonated material is then dried under vacuum for 48 hours at room temperature.

The corresponding data as given in the table for products properties below, show that the target ion exchange capacity (IEC) can be achieved within 2 hours after the addition of chlorosulfonic acid.

Example 8: Simulated Method of Making sPPE with an IEC of 2.5-3.0 Meq/g

The scheme is illustrated in FIG. 2.

A 3-necked round bottom glass flask equipped with a TEFLON stirrer, a reflux condenser, and a pressure equalized dropping funnel, was maintained at 40° C. 10.0 g of NORYL PPO™ 646 poly(phenylene ether) resin was dissolved in a 1,2-dichloroethane and ethyl acetate (179.5 g:11.7 g) mixture until a homogenous clear solution was obtained; 60 min. The temperature was maintained at 40° C. Chlorosulfonic acid (8.78 g) was transferred to a pressure equalized dropping funnel and the same was added into the 1,2-dichloroethane and ethylacetate mixture under vigorous stirring over a 30 minute period. A nitrogen purge was maintained through with rapid stirring. At the end of this addition, the stirred solution becomes slightly cloudy. Stirring was continued for an additional 210 minutes at 40° C. The reaction mass is subsequently slowly transferred along with 1,200 ml of DI water to a 2 L, baffled precipitation vessel maintained at 10° C. and fitted with a 4-blade of agitator of approximately 60 rum diameter, running at 1,000 rpm giving a tip-speed of 3.14 m/s. The temperature was subsequently ramped up to 25° C. after 1 hour. The stirring was continued for a total of 30 min. This was followed by filtration. The residue (sPPE) was then reslurried in a DI water and hexane (500 ml: 70 ml) mixture and refiltered. The residue washed thoroughly with DT water until neutral pH and then dried under vacuum for 48 hours at room temperature.

The industrial process scheme for the manufacturing of sPPE includes the dissolution of poly(phenylene ether) in 1,2-dichloroethane and ethyl acetate (basis ~100 kg/hr of poly(phenylene ether)) in the amount of 89.2 wt % EDC, 4.97 wt % poly(phenylene ether) and 5.83 wt % EA, based upon a total weight of the poly(phenylene ether), EA, and EDC, with a residence time of 10 to 15 minutes. Dissolved poly(phenylene ether) goes to the reaction vessel where the reaction with chlorosulfonic acid (87.8 kg/hr) takes place with the mole ratio 0.92 with respect to PPO. The reaction temperature is at 40° C. with the residence time of 30 mins. The HCl gas which is evolved during the process is vented from the reactor and scrubbed using alkali scrubber. The reaction mass from the reactor is precipitated in a precipitation vessel with poly(phenylene ether):water volume ratio of 1:50.

The precipitated mass is filtered and the wet SPPE goes for the purification by passing through two wash vessels and dried in a drier at the temperature of 50 to 60° C. at reduced pressure of 100 mmHg. The filtrate is a biphasic with 1,2-Dichloroethane and EA are the organic phase and water as an aqueous phase. Decanting (liquid-liquid separation) is done to separate the EDC & EA from water followed by distillation to separate EDC and EA. Both EDC and EA forms heterogeneous azeotrope with water. The distillation operation separates EDC and EA as a distillate which can be recycled and the organic heavies at the bottom. The recycle efficiency for water and solvent is more than 90%. The entire scheme has been simulated in Aspen to understand the recovery and recycle.

Example 9. Method of Making Sulfonated Polyphenylene Oxide with Ion Exchange Capacity of 2.5-3.0 Meq/g The scheme is illustrated in FIG. 3.

A 3-necked round bottom glass flask equipped with a Teflon stirrer, a reflux condenser and a pressure equalized dropping funnel was maintained at 40° C. 10.0 g of NORYL PPO™ 646 poly(phenylene ether) resin was dissolved in 1,2-Dichloroethane and tetramethylene sulfone (179.5 g:11.7 g) solvent mixture till a homogenous clear solution was obtained in 60 mins. The temperature was maintained at 40° C. 5.85 gm of chlorosulfonic acid was transferred accurately to a pressure equalized dropping funnel and the same was added into the 1,2-Dichloroethane-tetramethylene sulfone solution mixture under vigorous stirring over a 30-minute period. A nitrogen purge was maintained although with rapid stirring. At the end of this addition, the stirred solution becomes slightly cloudy. Stirring was continued for additional 210 minutes at 40° C. The reaction mass is subsequently slowly transferred with 1200 ml of DI water-hexane (50:50 w/w) (used as the anti-solvent mixture) to a 2 L baffled precipitation vessel maintained at 10° C. and fitted with a 4-blade of agitator of ~60 mm diameter, running at 1000 rpm giving a tip-speed of 3.14 in/s. The temperature was subsequently ramped up to 25° C. after 1 hour. The stirring was continued for a total of 30 mins. This was followed by filtration. The residue (sulfonated poly(phenylene ether)) was then reslurried in 500 ml DI water and refiltered. The residue washed thoroughly with DI water until neutral pH. The sulfonated material was then dried under vacuum for 48 hours at room temperature.

The Industrial process scheme for the manufacturing of the sulfonated poly(phenylene ether) consist of dissolution of poly(phenylene ether) in 1,2-dichloroethane and tetramethylene sulfone (basis ~100 kg/hr of poly(phenylene ether)) in an amount of 89.2 wt % EDC, 4.97 wt % poly(phenylene ether) and 5.83 wt % tetramethylene sulfone, based upon a total weight of the poly(phenylene ether), tetramethylene sulfone, and EDC, with a residence time of 10 to 15 minutes. Dissolved poly(phenylene ether) goes to the reaction vessel where the reaction with chlorosulfonic acid (58.5 kg/hr) takes place with the mole ratio of 0.613 with respect to the poly(phenylene ether). The reaction temperature is at 40° C. with the residence time of 30 min. The HCl gas, which is evolved during the process, is vented from the reactor and scrubbed using alkali scrubber. The reaction mass from the reactor is precipitated in a precipitation vessel with starting poly(phenylene ether):anti-solvent mixture volume ratio of 1:120.

The precipitated mass is filtered and the wet sPPE goes for purification by passing through two wash vessels and dried in a drier at the temperature of 50 to 60° C. at reduced pressure of 100 mmHg. The filtrate is biphasic with 1,2-dichloroethane, and tetramethylene sulfone are the organic phase and water as the aqueous phase. Decanting (liquid-liquid separation) to separate the EDC and tetramethylene sulfone from the water followed by distillation to separate the EDC and the tetramethylene sulfone. The distillation operation separates the EDC and the tetramethylene sulfone, as a distillate which can be recycled, with the organic heavies at the bottom. The recycle efficiency for the water and the solvent is more than 90%. The entire scheme has been simulated in Aspen to understand the recovery and recycle.

Example 10. Scaled Up Ratio (500:1, from Example 1): Method of Making 5 Kilograms (Kg) Sulfonated Polyphenylene Ether (sPPE) with Ion Exchange Capacity (IEC) of 1.5-1.6 Milliequivalent Per Gram (Meq/g)

| Input | Quantity |
| --- | --- |
| Sulfonation: | |
| NORYL ™ PPO 646 resin | 5 kg |
| ethylene dichloride | 100 L |

-continued

| Input | Quantity |
|---|---|
| chlorosulfonic acid | 1250 g (714 mL) |
| hexane | 175 L |
| DI water | 600 L |

A multi neck 100 L reactor equipped with overhead stirrer reflux condenser, addition port and nitrogen purger was charged with NORYL PPO™ 646 poly(phenylene ether) resin (at a reaction temperature (RT) of 25 to 30° C.) and 1,2 ethylene dichloride (EDC). The reaction mass (RM) was heated to 30 to 35° C. under stirring to get clear solution. Chlorosulfonic acid was added under nitrogen purging over a period of 20 to 25 min under vigorous stirring. The resultant reaction mass was stirred vigorously at RT for another 90 min under nitrogen. The reaction mass was added to a 500 L reactor containing pre-cooled mixture of 175 L hexane and 100 L DI water. The resultant precipitate was allowed to reach RT and was stirred at that same temperature for 10 hours. The solids were filtered via centrifuge and spin dried, and the wet solids were unloaded. The wet solids were stirred with 250 L DI water at RT for 4 h. The solids were filtered via centrifuge; spin dried well and the wet solids were unloaded. The wet solids were reslurried with additional 250 L DI water at RT for 14 hours at a neutral pH to isolate the sulfonated product.

The solids were dried in a vacuum tray drier (VTD) at temperature of 35 to 40° C. for 72 h. The resultant sulfonated polymer weighed: ~5.25 kg.

Example 11: Method of Making sPPE with TEC of 1.8-2.0 Meq/g to Determine the Effect of the Cosolvent The scheme is illustrated in FIG. 2.

Example 2 was repeated without the use of a cosolvent. A 3-necked round bottom glass flask equipped with a TEFLON stirrer, a reflux condenser and a pressure equalized dropping funnel was maintained at 40° C. 10.0 g of NORYL PPO™ 646 poly(phenylene ether) resin was dissolved in a 1,2-dichloroethane (179.5 g) mixture until a homogenous clear solution was obtained; 60 min. The temperature was maintained at 40° C. 5.85 g of chlorosulfonic acid was transferred to a pressure equalized dropping funnel and the same was added into the 1,2-dichloroethane solution mixture under vigorous stirring over a 30 minute period. A nitrogen purge was maintained through with rapid stirring. At the end of this addition, the reaction mass developed heterogeneity and the product precipitated out of the reaction mass. Stirring was continued for an additional 210 minutes at 40° C. The reaction mass was subsequently slowly transferred along with 1,200 ml of DI water (e.g., as the anti-solvent mixture) to a 2 L baffled precipitation vessel maintained at 10° C. and fitted with a 4-blade agitator of about 60 mm diameter, running at 1,000 rpm giving a tip-speed of 3.14 m/s. The temperature was subsequently ramped up to 25° C. after 1 hour. The stirring was continued for a total of 30 mins. This was followed by filtration. The residue (sulfonated PPO) was then reslurried in DI water-hexane (500 ml:70 ml) mixture and refiltered. The residue was washed thoroughly with DI water until neutral pH. The sulfonated material is then dried under vacuum for 48 hours at room temperature.

The sulfonated product once isolated using the exact procedure as cited in Example 2, had a degree of sulfonation of was 20 to 24% (non-uniform) as measured by NMR. This level was lower than the 31.42% degree of sulfonation of Example 2 which used ethyl acetate as a cosolvent. The development of heterogeneity and the subsequent phase separation of the sulfonated polymer prevented further sulfonation beyond 24%. However, as illustrated in Examples 2 through 9, inclusions of the co-solvent, ensured reaction homogeneity through the course of the sulfonations enabling higher degrees of sulfonation in the product, e.g., 24% here, with 31% in Example 2.

Ion Exchange Capacity by potentiometry: The ion exchange capacity (IEC) indicates the number of milliequivalents of ions in 1 g of the dry polymer. The degree of substitution (DS) indicates the percentage of repeat units bearing the sulfonic acid group along the sulfonated polymer molecular chain. The method involves dissolving the sPPE in a dimethyl acetamide/isopropyl alcohol mixture and titrating with alcoholic potassium hydroxide by potentiometric method. This non-aqueous titration was performed with Solvatrode (commercially available from Metrohm USA) as the electrode. This method uses a two solvent system. Consequently a sharp and reproducible end point is obtained.

The sample was dissolved in the dimethyl acetamide and was diluted with the isopropyl alcohol to get reproducible ion exchange capacity. With only dimethyl acetamide, no sharp end point was obtained with considerable variability in replicate analysis. Not to be limited by theory, it is believed that this bi-solvent system helps in controlling the polarity and enables attaining a reproducible, sharp end point.

$$\text{Ion exchange capacity}(^{meq}/g) = \frac{(B-A)N}{S}$$

Where: A=volume in ml of 0.1N potassium hydroxide (KOH) solution required for titration;
B=volume in ml of 0.1N KOH solution required for blank;
F=normality of 0.1N KOH solution; and
S=sample weight in grams.

Figure 4:
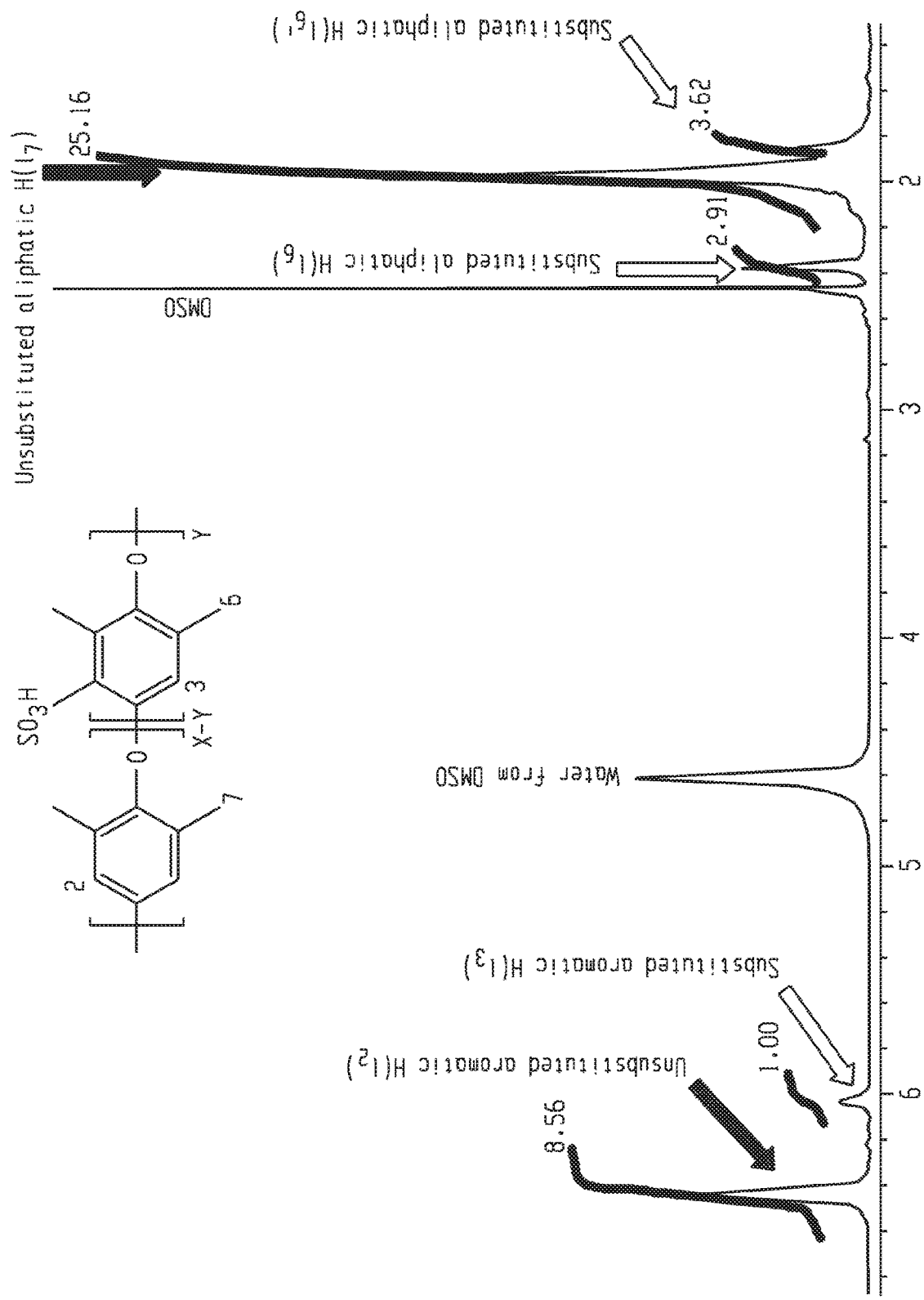
FIG. 4 is a nuclear magnetic resonance graph for degree of sulfonation.

Degree of sulfonation (DS) (also referred to as sulfonation level) determined by nuclear magnetic resonance spectroscopy (NMR): The samples are dissolved in dimethyl sulfoxide-$d_6$ (DMSO-$d_6$, also known as deuterated DMSO) (with the help of overnight shaking in a horizontal shaker), 32 scans were averaged with 5 seconds delay. In case of undissolved portions, the solvent vial was sonicated in a water bath at 45° C. for 15-30 minutes. An example of the resulting graph is illustrated in FIG. 4.

The degree of sulfonation can be calculated either from the aliphatic or aromatic protons:
considering aromatic protons:

$$DS\% = \frac{I3}{(0.5*I2)+I3}$$

considering aliphatic protons:

$$DS\% = \frac{2*I6}{I6+I7}$$

wherein I is Integration value of the NMR chemical shifts at a given ppm. Refer NMR Spectra in the disclosure Molecular Weight: A gel permeation chromatography (GPC) method for estimation of the molecular weight (weight average molecular weight (Mw) and number average molecular weight (Mn)) was developed for the sPPE by using dimethyl formamide as a mobile phase with 0.1 wt %, based upon the weight of the mobile phase of lithium bromide as an additive. Agilent 2× (e.g., 2 columns) PLgel 5 micrometer (μm) MIXED-B, 300×7.5 mm, with one guard, column was used for the elution of sPPE with 1 milliliter per minute (ml/min) flow rate and 400° C. of column temperature. Ultraviolet (UV) detector (at 254 nanometers (nm)) was used to record the GPC chromatogram of sPPE, with an elution time of 30 min. Samples were slowly dissolved in the dimethyl formamide solvent at a concentration of two milligram per milliliter (mg/ml) for about 4 to 6 hours in a horizontal shaker. The solutions were filtered through a 0.45 μm PTFE filter into a GPC auto sampler vials for analysis. The GPC system calibrated with polystyrene standards in the range of to 180 Dalton (Da) to 6870 kDa. Agilent ChemStation software was used to set the baseline points.

Polydispersity Index (PDT or Đ): can be determined by the following formula:

$$Đ = Mw/Mn$$

Estimation of solubility: 0.1 g of the sPPE was placed in 10 ml of the respective solvents in polypropylene centrifuge tubes. The solvents were tetrahydrofuran (THF), methanol (MeOH), N-methyl-2-pyrroilidone (NMP), dimethylformamide (DMF), and dimethylacetamide (DMAc). The same were kept in shaker for 24 hours. The solutions were subsequently observed for any inhomogeneity.

TABLE 1

Product Properties

| Example No. | IEC meq/g | DS % | Mn Daltons | Mw Daltons | PDI |
|---|---|---|---|---|---|
| 1 | 1.52 | 22 | 86410 | 169813 | 2 |
| 2 | 2.16 | 31.41 | 99626 | 192170 | 1.9 |
| 3 | 2.24 | 33.6 | 113457 | 227190 | 1.9 |
| 4 | 1.7 | 24.4 | 99606 | 196027 | 1.9 |
| 5 | 1.84 | 29.8 | 105327 | 203310 | 1.9 |
| 6 | 2.08 | 30.4 | 103800 | 200930 | 1.9 |
| 7 | 2 | 29.2 | 110252 | 218753 | 1.9 |

TABLE 1-continued

Product Properties

| Example No. | IEC meq/g | DS % | Mn Daltons | Mw Daltons | PDI |
|---|---|---|---|---|---|
| 8 | 2.6 | 42.1 | 108600 | 204653 | 1.9 |
| 9 | 2.725 | 41.76 | 104737 | 196537 | 1.8 |
| 10 | 1.50 | 20.8 | 75334 | 155243 | 2.0 |

TABLE 2

Solubility Data

| Example No. | THF | MeOH | NMP | DMF | DMAc |
|---|---|---|---|---|---|
| 1 | Y | N | Y | Y | Y |
| 2 | Y | Y | Y | Y | Y |
| 3 | Y | Y | Y | Y | Y |
| 4 | Y | Y | Y | Y | Y |
| 5 | Y | Y | Y | Y | Y |
| 6 | Y | Y | Y | Y | Y |
| 7 | Y | Y | Y | Y | Y |
| 8 | Y | Y | Y | Y | Y |
| 9 | Y | Y | Y | Y | Y |
| 10 | Y | N | Y | Y | Y |

TABLE 3

Recovery & Recycle (R&R)

| Method used for the following Examples | 1,2-Dichloroethane | | | Ethyl Acetate | | | Water | | |
|---|---|---|---|---|---|---|---|---|---|
| | Input Kg/hr | Recycled Kg/hr | R&R wt % | Input Kg/hr | Recycled Kg/hr | R&R wt % | Input Kg/hr | Recycled Kg/hr | R&R wt % |
| 1 | 1000 | 995 | 99.5 | NA | NA | NA | 2000 | 1800 | 90% |
| 2 | 1795 | 1780 | 99.1 | 117 | 114.52 | 97.8 | 12000 | 11400 | 95% |
| 3-7 | 939 | 934.3 | 99.5 | 61.2 | 59.9 | 98 | 5000 | 4700 | 94% |
| 8 | 1795 | 1780 | 99.1 | 117 | 114.52 | 97.8 | 12000 | 11400 | 94% |
| 9 | 1795 | 1775 | 99.0 | NA | NA | NA | 12000 | 11400 | 94% |

The recovery and recycling of the solvent and co-solvent has been studied by simulation and demonstrated in the lab scale for understanding the commercial viability of the process involving recovery and recycling of the solvent streams. The solvent quantity and type has been selected considering the recyclability of solvent as one of the principles in the claimed scheme.

In this process the major solvent which is common in all the examples is 1,2 dichloroethane which is distilled in the distillation unit (80) from the trace of water and recycled. In all the cases the recovery is above 99% in terms of the 1,2 dichloroethane.

The ethyl acetate is used as a co-solvent along with the 1,2 dichloroethane in Examples 2, 3-7, and 8. The ethyl-acetate together with the 1,2 dichloroethane can be distilled in the distillation unit (80) and recycled for the sulphonation reaction. The recovery of the ethyl-acetate is above 97%.

The recycle of water is common in all of the above examples, after the separation of aqueous vs organic in the decanter (60) the aqueous layer (mainly water) is evaporated in a multiple effect evaporator and recycled e.g., to precipitation and/or filtration units. The recycled water accounts to be 90%, preferably 94% or more, of the total quantity of water used.

Hence, the commercial viability of this sulfonation process wherein poly(phenylene either is sulfonated to 20%-50% using 1,2 dichloroethane and a co-solvent. Has been proven. Although the ethyl-acetate has greater recyclability, the cosolvent can be at least one of methyl ethyl ketone, diethyl ether, methyl ethyl sulfone, ethyl acetate, or tetramethylene sulfone.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

A method for sulfonation of poly(phenylene ether) can comprise: dissolving poly(phenylene ether) in a mixture of 1,2-dichloroethane and a cosolvent to form a solvent mixture in a mixing vessel, wherein the cosolvent comprises at least one of methyl ethyl ketone, diethyl ether, methyl ethyl sulfone, ethyl acetate, or tetramethylene sulfone; combining a sulfonating agent with the solvent mixture, wherein the sulfonating agent reacts with the poly(phenylene ether) to form sulfonated poly(phenylene ether); precipitating the sulfonated poly(phenylene ether); and filtering the precipitated sulfonated poly(phenylene ether) to form a sulfonated poly(phenylene ether) precipitate and a filtrate; wherein the sulfonated poly(phenylene ether) has a sulfonation level of 20 to 50%.

The present method is further defined by the following aspects.

Aspect 1: A method for sulfonation of poly(phenylene ether), comprising: dissolving a poly(phenylene ether) comprising 2,6-dimethyl-1,4-phenylene ether units, 2,3,6-trimethyl-1,4-phenylene ether units, 3,3',5,5'-tetramethyl-4,4'-dihydroxybiphenyl ether units, or a combination thereof in a mixture of 1,2-dichloroethane and preferably a cosolvent to form a solvent mixture in a mixing vessel; combining a sulfonating agent with the solvent mixture, wherein the sulfonating agent reacts with the poly(phenylene ether) to form sulfonated poly(phenylene ether); precipitating the sulfonated poly(phenylene ether); and filtering the precipitated sulfonated poly(phenylene ether) to form a sulfonated poly(phenylene ether) precipitate and a filtrate; wherein the sulfonated poly(phenylene ether) has a sulfonation level of 20 to 50%.

Aspect 2: A method for sulfonation of poly(phenylene ether), comprising: dissolving poly(phenylene ether) in a mixture of 1,2-dichloroethane and preferably a cosolvent to form a solvent mixture in a mixing vessel; combining a sulfonating agent with the solvent mixture, wherein the sulfonating agent reacts with the poly(phenylene ether) to form sulfonated poly(phenylene ether); precipitating the sulfonated poly(phenylene ether); and filtering the precipitated sulfonated poly(phenylene ether) to form a sulfonated poly(phenylene ether) precipitate and a filtrate; wherein the sulfonated poly(phenylene ether) has a uniform sulfonation level, and the sulfonation level is in the range of 20 to 50%.

Aspect 3: A method for sulfonation of poly(phenylene ether), comprising: determining the desired sulfonation level; if the desired sulfonation level is greater than 20% then dissolving poly(phenylene ether) in a mixture of 1,2-dichloroethane and a cosolvent to form a solvent mixture in a mixing vessel, and if the sulfonation level is less than or equal to 20% then dissolving poly(phenylene ether) in a mixture of 1,2-dichloroethane and no cosolvent to form a solvent mixture in a mixing vessel; then combining a sulfonating agent with the solvent mixture, wherein the sulfonating agent reacts with the poly(phenylene ether) to form sulfonated poly(phenylene ether); precipitating the sulfonated poly(phenylene ether); and filtering the precipitated sulfonated poly(phenylene ether) to form a sulfonated poly(phenylene ether) precipitate and a filtrate. Preferably the sulfonated poly(phenylene ether) has a uniform sulfonation level.

Aspect 4: The method of any of the preceding aspects, wherein the solvent mixture comprises the cosolvent, and wherein the cosolvent comprises at least one of methyl ethyl ketone, diethyl ether, methyl ethyl sulfone, ethyl acetate, or tetramethylene sulfone.

Aspect 5: The method of any of the preceding aspects, wherein the cosolvent comprises at least one of ethyl acetate or tetramethylene sulfone.

Aspect 6: The method of any of the preceding aspects, wherein the cosolvent comprises ethyl acetate.

Aspect 7: The method of any of the preceding aspects, wherein the cosolvent is ethyl acetate.

Aspect 8: The method of any of the preceding aspects, wherein the dissolving is at a temperature of 30° C. to 60° C.

Aspect 9: The method of any of the preceding aspects, wherein the solvent mixture comprised: 1 to 20 wt % of the poly(phenylene ether); 80 to 99 wt % of the 1,2-dichloroethane; and 0 to 10 wt % of the cosolvent, preferably greater than zero to 10 wt %; wherein the weight percentages are based upon 100 wt % of the solvent mixture.

Aspect 10: The method of any of the preceding aspects, wherein the solvent mixture comprised: 1 to 10 wt %, preferably 5 to 10 wt %, of the poly(phenylene ether); 70 to 90 wt %, preferably 80 to 90 wt % of the 1,2-dichloroethane; and 1 to 10 wt %, preferably 2 to 6 wt % of the cosolvent; wherein the weight percentages are based upon 100 wt % of the solvent mixture.

Aspect 11: The method of any of the preceding aspects, further comprising recovering the solvent and the cosolvent.

Aspect 12: The method of Aspect 11, wherein recovering the solvent and cosolvent comprises decantation of the filtrate, to form an organic stream, and distilling the organic stream.

Aspect 13: The method of any of Aspects 11-12, further comprising recycling the solvent and the cosolvent to the mixing vessel.

Aspect 14: The method of any of the preceding aspects, wherein the sulfonation level is 25% to 50%, preferably 28% to 50%, as determined by NMR.

Aspect 15: The method of any of the preceding aspects, wherein the sulfonated poly(phenylene ether) has a uniform sulfonation level in the range of 20 to 50%, preferably in the range of 25% to 50%, more preferably 28% to 50%, as determined by NMR.

Aspect 16: The method of any of the preceding aspects, wherein greater than 97 wt %, preferably greater than or equal to 99 w % of the 1,2-dichloroethane is recycled.

Aspect 17: The method of any of the preceding aspects, wherein greater than 95 wt %, preferably greater than or equal to 97 w % of the cosolvent is recycled.

Aspect 18: The method of any of the preceding aspects, wherein greater than 90 wt %, preferably greater than or equal to 93 w % of water used in the process is recycled.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue.

As used herein "uniform" means the same degree of sulfonation across the isolated mass of the sulfonated polymer product as determined by 1H-NMR of at least 5 small samples taken from the entire product mass.

All weight percentages are based upon a total of 100 weight percent.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for sulfonation of poly(phenylene ether), comprising
    dissolving a poly(phenylene ether) comprising 2,6-dimethyl-1,4-phenylene ether units, 2,3,6-trimethyl-1,4-phenylene ether units, 3,3',5,5'-tetramethyl-4,4'-dihydroxybiphenyl ether units, or a combination thereof, in 1,2-dichloroethane and a cosolvent to form a solvent mixture in a mixing vessel, wherein the cosolvent comprises methyl ethyl ketone, diethyl ether, methyl ethyl sulfone, ethyl acetate, tetramethylene sulfone, or a combination thereof;
    combining a sulfonating agent with the solvent mixture, wherein the sulfonating agent reacts with the poly(phenylene ether) to form sulfonated poly(phenylene ether);
    precipitating the sulfonated poly(phenylene ether); and
    filtering the precipitated sulfonated poly(phenylene ether) to form a sulfonated poly(phenylene ether) precipitate and a filtrate;
    wherein the sulfonated poly(phenylene ether) has a sulfonation level of 20 to 50%.

2. A method for sulfonation of poly(phenylene ether), comprising:
    determining the desired sulfonation level;
    if the desired sulfonation level is greater than 20% then dissolving a poly(phenylene ether) comprising 2,6-dimethyl-1,4-phenylene ether units, 2,3,6-trimethyl-1, 4-phenylene ether units, 3,3',5,5'-tetramethyl-4,4'-dihydroxybiphenyl ether units, or a combination thereof, in 1,2-dichloroethane and a cosolvent to form a solvent mixture in a mixing vessel, wherein the cosolvent comprises methyl ethyl ketone, diethyl ether, methyl ethyl sulfone, ethyl acetate, tetramethylene sulfone, or a combination thereof;
    combining a sulfonating agent with the solvent mixture, wherein the sulfonating agent reacts with the poly(phenylene ether) to form sulfonated poly(phenylene ether);
    precipitating the sulfonated poly(phenylene ether); and
        filtering the precipitated sulfonated poly(phenylene ether) to form a sulfonated poly(phenylene ether) precipitate and a filtrate, and
        if the desired sulfonation level is less than or equal to 20% then dissolving poly(phenylene ether) in a solvent mixture comprising 1,2-dichloroethane and greater than 1 to 10 wt % of a cosolvent, wherein the weight percentages are based upon 100 wt % of the solvent mixture, to form a solvent mixture in a mixing vessel; then combining a sulfonating agent with the solvent mixture, wherein the sulfonating agent reacts with the poly(phenylene ether) to form sulfonated poly(phenylene ether); precipitating the sulfonated poly(phenylene ether); and filtering the precipitated sulfonated poly(phenylene ether) to form a sulfonated poly(phenylene ether) precipitate and a filtrate.

3. The method of claim 1, wherein the cosolvent comprises ethyl acetate, tetramethylene sulfone, or a combination thereof.

4. The method of claim 1, wherein the cosolvent comprises ethyl acetate.

5. The method of claim 1, wherein the cosolvent is ethyl acetate.

6. The method of claim 1, wherein the dissolving is at a temperature of 30° C. to 60° C.

7. The method of claim 1, wherein the solvent mixture comprised:
1 to 20 wt % of the poly(phenylene ether);
80 to 99 wt % of the 1,2-dichloroethane; and
1 to 10 wt % of the cosolvent;
wherein the weight percentages are based upon 100 wt % of the solvent mixture.

8. The method of claim 1, wherein the solvent mixture comprised:
1 to 10 wt % of the poly(phenylene ether);
70 to 90 wt % of the 1,2-dichloroethane; and
1 to 10 wt % of the cosolvent;
wherein the weight percentages are based upon 100 wt % of the solvent mixture.

9. The method of claim 1, further comprising recovering the solvent and the cosolvent.

10. The method of claim 9, wherein recovering the solvent and the cosolvent comprises decantation of the filtrate, to form an organic stream, and distilling the organic stream.

11. The method of claim 9, further comprising recycling the solvent and the cosolvent to the mixing vessel.

12. The method of claim 1, wherein the sulfonation level is 25% to 50% as determined by NMR.

13. The method of claim 1, wherein the sulfonated poly(phenylene ether) has a uniform sulfonation level of 20 to 50% as determined by NMR.

14. The method of claim 11,
wherein greater than 97 wt % of the 1,2-dichloroethane is recycled; and/or
wherein greater than 95 wt % of the cosolvent is recycled.

15. The method of claim 1, wherein the cosolvent is present from greater than 1 to 10 wt % wherein the weight percentage are based upon 100 wt % of the solvent mixture.

16. The method of claim 1, wherein the cosolvent is present from greater than 2 to 6 wt % wherein the weight percentage are based upon 100 wt % of the solvent mixture.

17. The method of claim 1, wherein the solvent mixture comprised:
5 to 10 wt %, of the poly(phenylene ether);
80 to 90 wt % of the 1,2-dichloroethane; and
2 to 6 wt % of the cosolvent;
wherein the weight percentages are based upon 100 wt % of the solvent mixture.

18. A method for sulfonation of poly(phenylene ether), comprising
dissolving a poly(phenylene ether) comprising 2,6 dimethyl 1,4-phenylene ether units, 2,3,6 trimethyl-1,4-phenylene ether units, 3,3',5,5'-tetramethyl-4,4'-dihydroxybiphenyl ether units, or a combination thereof, in 1,2-dichloroethane and optionally a cosolvent to form a solvent mixture in a mixing vessel;
combining a sulfonating agent with the solvent mixture, wherein the sulfonating agent reacts with the poly(phenylene ether) to form sulfonated poly(phenylene ether);
precipitating the sulfonated poly(phenylene ether); and
filtering the precipitated sulfonated poly(phenylene ether) to form a sulfonated poly(phenylene ether) precipitate and a filtrate;
wherein the sulfonated poly(phenylene ether) has a uniform sulfonation level of 20 to 50% as determined by NMR.

19. A method for sulfonation of poly(phenylene ether), comprising:
determining a desired sulfonation level;
if the desired sulfonation level is greater than 20% then dissolving a poly(phenylene ether) comprising 2,6 dimethyl 1,4-phenylene ether units, 2,3,6 trimethyl-1,4-phenylene ether units, 3,3',5,5'-tetramethyl-4,4'-dihydroxybiphenyl ether units, or a combination thereof, in 1,2-dichloroethane and optionally a cosolvent to form a solvent mixture in a mixing vessel;
combining a sulfonating agent with the solvent mixture, wherein the sulfonating agent reacts with the poly(phenylene ether) to form sulfonated poly(phenylene ether);
precipitating the sulfonated poly(phenylene ether); and
filtering the precipitated sulfonated poly(phenylene ether) to form a sulfonated poly(phenylene ether) precipitate and a filtrate, and
if the desired sulfonation level is less than or equal to 20% then dissolving poly(phenylene ether) in 1,2-dichloroethane and optionally a cosolvent to form a solvent mixture in a mixing vessel; then combining a sulfonating agent with the solvent mixture, wherein the sulfonating agent reacts with the poly(phenylene ether) to form sulfonated poly(phenylene ether); precipitating the sulfonated poly(phenylene ether); and filtering the precipitated sulfonated poly(phenylene ether) to form a sulfonated poly(phenylene ether) precipitate and a filtrate;
wherein the sulfonated poly(phenylene ether) has a uniform sulfonation level as determined by NMR.

* * * * *